Figure 1:
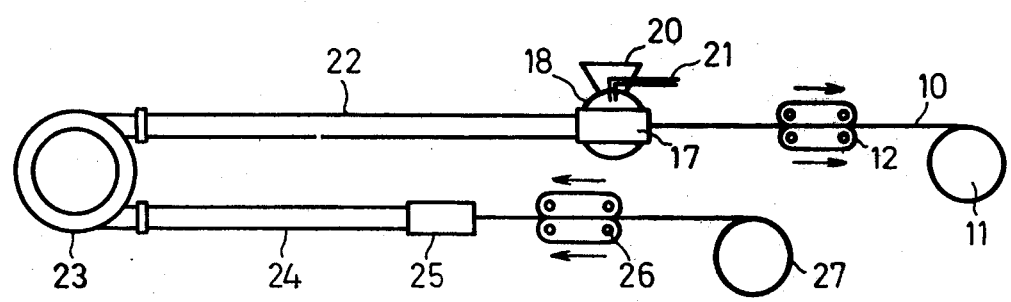

United States Patent [19]

Jansson et al.

[11] 4,226,823

[45] Oct. 7, 1980

[54] METHOD OF APPLYING A STRIPPABLE OUTER SEMICONDUCTIVE LAYER ON AN INSULATED CABLE CONDUCTOR

[75] Inventors: Gunnar Jansson, Älvsjö; Gustaf Linderoth, Bromma, both of Sweden

[73] Assignee: ASEA Aktiebolag, Vesteras, Sweden

[21] Appl. No.: 967,512

[22] Filed: Dec. 7, 1978

Related U.S. Application Data

[63] Continuation of Ser. No. 803,643, Jun. 6, 1977, abandoned.

[30] Foreign Application Priority Data

Jun. 10, 1976 [SE] Sweden .............................. 7606528

[51] Int. Cl.³ .............................................. B29F 3/10
[52] U.S. Cl. ........................... 264/174; 174/110 PM; 174/120 SR; 174/120 SC; 264/211; 264/236; 264/347
[58] Field of Search ............... 264/174, 236, 347, 211, 264/349; 260/889; 174/110 PM, 120 SR, 120 SC

[56] References Cited

U.S. PATENT DOCUMENTS

| | | | |
|---|---|---|---|
| 3,318,977 | 5/1967 | Battersby et al. | 260/889 |
| 3,386,925 | 6/1968 | Dillhoefer | 260/889 |
| 3,424,631 | 1/1969 | Peacock | 174/110 PM |
| 3,591,674 | 7/1971 | Engel | 264/209 |
| 3,684,821 | 8/1972 | Miyauchi et al. | 174/110 PM |
| 3,719,769 | 3/1973 | Miyauchi et al. | 174/120 SC |
| 3,787,255 | 1/1974 | Carini et al. | 174/120 SR |
| 3,808,047 | 4/1974 | McAda | 428/379 |
| 3,840,694 | 10/1974 | Luczak | 174/110 PM |
| 3,923,947 | 12/1975 | Cook | 264/141 |

*Primary Examiner*—Jeffery R. Thurlow
*Attorney, Agent, or Firm*—Watson, Cole, Grindle & Watson

[57] ABSTRACT

In cables where the conductor is provided with an insulation of thermoplastic or cross-linked polyethylene, the insulation may be covered with a strippable outer semiconductive layer consisting of a cross-linked polymer composition which comprises a copolymer of ethylene and vinyl acetate and further carbon black and an organic peroxide. The strippable layer is applied on the conductor insulation by extrusion of the polymer composition in an extrusion machine and by a subsequent crosslinking in the polymer composition.

11 Claims, 2 Drawing Figures

METHOD OF APPLYING A STRIPPABLE OUTER SEMICONDUCTIVE LAYER ON AN INSULATED CABLE CONDUCTOR

This is a continuation of application Ser. No. 803,643, filed June 6, 1977, now abandoned.

SUMMARY OF THE INVENTION

The present invention deals with achieving considerable improvements of the properties of a strippable outer semiconductive layer applied to an insulated conductor and to a method of facilitating the manufacture of such products which are formed by extrusion techniques. The improvements are achieved by supplying the organic peroxide to the polymer composition when this is located in the extrusion machine. By supplying the peroxide in this way it is possible, by adjusting the amount of peroxide supplied to the polymer composition during the extrusion, to adjust the properties of the outer semiconductive layer so that it acquires the desired strippability and in other respects a high and uniform quality. Among other things, the tear strength of the material in the layer is to a great extend dependent on the amount of peroxide added. The forming of the polymer composition in the extrusion machine can be facilitated by choosing a peroxide which has a lubricant effect on the polymer composition. The best possible effect in this respect is attained by using a peroxide which is liquid. An important property of the present invention is further that it permits the use of an extremely pure polymer composition. Since the polymer composition prior to the forming does not contain any peroxide, the polymer composition can then be allowed to adopt a sufficiently high temperature to be able to be filtered. For the same reason if may be pelletized without difficulty, which is a clear advantage for the extrusion process. The fact that the polymer composition can be liberated from impurities means that impurities, which in the boundary layer between insulation and outer semiconductive layer may cause high local field stresses, are avoided in the final cable.

More particularly, the present invention relates to a method of applying on a cable conductor provided with an insulation of thermoplastic or crosslinked polyethylene, with the use of an extrusion machine, an outer semiconductive, strippable layer by the application of a polymer composition which comprises a polymer material comprising a copolymer of ethylene and vinyl acetate, further carbon black, and to which an organic peroxide has been added, characterised in that the organic peroxide is supplied to the polymer composition when the polymer composition is positioned in the extrusion machine.

The copolymer of ethylene and vinyl acetate contains suitably 20-80 percent by weight of ethylene and 80-20 percent by weight vinyl acetate, preferably 40-80 percent by weight of ethylene and 60-20 percent by weight of vinyl acetate. Besides this copolymer, the polymer material may contain an elastomer and/or polyethylene. The term polymer material as used in this application thus comprises the noted copolymer and other polymers possibly included, whereas the term polymer composition as used in this application comprises the polymer material and other additives with the exception of the peroxide. The amount of elastomer in the polymer material may be from 0 to 40 parts by weight and the amount of polyethylene similarly 0 to 40 parts by weight per 100 parts by weight of copolymer of ethylene and vinyl acetate. Examples of usable elastomers are nitrile rubber, chlorsulphonated polyethylene, ethylene propylene rubber, polychloroprene, styrene-butadiene rubber, natural rubber, polyester rubber and polyurethane rubber. The addition of elastomer and polyethylene, respectively, is made primarily to regulate the adhesion of the strippable layer to the conductor insulation.

The amount of carbon black is suitably 5-100 and preferably 10-80 parts by weight per 100 parts by weight of polymer material.

The amount of peroxide is suitably 0.1-5 and preferably 1-4 parts by weight per 100 parts by weight of polymer material.

Examples of suitable peroxides are di-t-butyl peroxide, 2,5-dimethyl-2,5-di(t-butylperoxy)-hexane, 2,5-dimethyl-2,5-di(t-butylperoxy)-hexyne-3, 2.2-bis(t-butylperoxy)-butane, which are all liquid, and mixtures of at least two of these and mixtures of one or more of these with one or more other organic peroxides such as di-α-cumyl peroxide, di-(tert.-butyl peroxiisopropyl)-benzene, di-(tert.-butylperoxi)trimethyl cyclohexane, bensoylperoxide, dimethyl-di(perbenboate), tert.-butyl peracetate, N-butyl-bis(tert.-butyl-peroxi)-valerate, tert.-butyl perbensoate, di-chlorobensoylperoxide, cumene hydroperoxide, tert.-butyl cumyl peroxide, and butane carbon acid-n-butyl ester.

The polymer composition may include fillers, for example, chalk, kaolin, magnesium silicate, aluminium silicate, aluminium oxide, quartz, talcum and barium sulphate. The amount of filler is suitably 0-200 and preferably 0-100 parts by weight per 100 parts by weight polymer material.

Further, the polymer composition may contain conventional additives, among other things in the form of antioxidants, for example, ketonamines such as polymerized trimethyl dihydroquinoline, and lubricant, for example, stearic acid.

Figure 2:
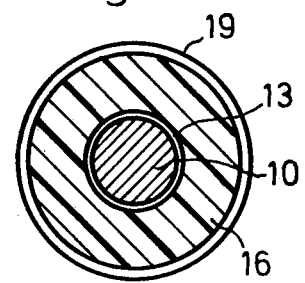

The invention will be explained in more detail by way of a number of examples with reference to the accompanying drawing, in which FIG. 1 schematically shows a means for manufacturing a cable according to the invention and FIG. 2 a cross-section of a cable as manufactured.

EXAMPLE 1

A polymer composition is prepared by kneading the components mentioned below and rolling them into a homogeneous compound, whereafter the compound is formed into tapes or granulates:

46.8 parts by weight ethylene-vinyl acetate copolymer containing 60 percent by weight ethylene and 40 percent by weight vinyl acetate (such as Levapren 400 from Farben-fabriken Bayer AG, Germany).

11.3 parts by weight polychloroprene (such as Baypren 211 from Farben-fabriken Bayer AG).

39.0 parts by weight carbon black of conductive type (such as Vulcan XC-72 from Cabot Carbon Ltd., England).

0.6 parts by weight stearic acid (lubricant).

0.6 parts by weight alkylated diphenyl amine (antioxidant, such as Nonox OD from ICI, England).

1.7 parts by weight polymerized trimethyl dihydroquinoline (antioxidant, such as Flectol from Monsanto Comp., U.S.A.).

In the extrusion of the polymer composition described later on, 2.5 parts by weight di-t-butyl peroxide is added to the polymer composition when it is positioned in the extrusion machine. The crosslinking is performed at 220° C. for a few minutes.

EXAMPLE 2

A polymer composition is prepared by kneading the components mentioned below and rolling them together into a homogeneous compound, whereafter the compound is formed into tapes or granulates.

50.0 parts by weight ethylene-vinyl acetate copolymer containing 60 percent by weight ethylene and 40 percent by weight vinyl acetate (such as Levapren 400).

12.6 parts by weight polyethylene (such as Alkathene 17/04/00 from ICI).

34.5 parts by weight carbon black of conductive type (such as Vulcan XC-72).

0.6 parts by weight stearic acid (lubricant).

0.6 parts by weight alkylated diphenyl amine (antioxidant, such as Nonox OD).

1.7 parts by weight polymerized trimethyl dihydroquinoline (anti-oxidant, such as Flectol).

In the extrusion of the polymer composition described later on, 2.5 parts by weight 2,5-dimethyl-2,5-di(t-butylperoxy)-hexyne is added to the polymer composition when it is located in the extrusion machine. The crosslinking is performed at 220° C. for a few minutes.

EXAMPLE 3

A polymer composition is manufactured and extruded in the manner described in Example 1, with the difference that instead of the ethylene-vinyl acetate copolymer mentioned there the same amount of ethylene-vinyl acetate copolymer is used containing 67 percent by weight of ethylene and 33 percent by weight of vinyl acetate (such as Levapren 336).

EXAMPLE 4

A polymer composition is prepared by kneading the components mentioned below and rolling them together into a homogeneous compound, whereafter the compound is formed into tapes or granulates.

45.8 parts by weight ethylene-vinyl acetate copolymer containing 60 percent by weight ethylene and 40 percent by weight vinyl acetate (such as Levapren 400).

11.4 parts by weight chlorsulphonated polyethylene (such as Hypalon 40 from E. I. du Pont de Nemours & Co. U.S.A.).

39.9 parts by weight carbon black of conductive type (such as Vulcan XC-72).

0.6 parts by weight stearic acid (lubricant).

0.6 parts by weight alkylated diphenylamine (antioxidant, such as Octamine from Rubber Regenerating Co. Ltd., England.

1.7 parts by weight polymerized trimethyl dihydroquinoline (anti-oxidant, such as Flectol).

In the extrusion of the polymer composition described later on, 2.5 parts by weight di-t-butyl peroxide is added to the polymer composition when it is positioned in the extrusion machine. The crosslinking is performed at 160° C. for a few minutes.

EXAMPLE 5

A polymer composition is manufactured and extruded in the manner described in Example 4, with the difference that, instead of the chlorsulphonated polyethylene mentioned there, the same amount of nitrile rubber is used (such as Hycar 1042 from NV Chemische Industri AKU-Goodrich, Holland).

EXAMPLE 6

A polymer composition is prepared by kneading the components mentioned below and rolling them together into a homogeneous compound, whereafter the compound is formed into tapes or granulates.

80.5 parts by weight ethylene-vinyl acetate copolymer containing 60 percent by weight ethylene and 40 percent by weight vinyl acetate (such as Levapren 400).

15.6 parts by weight carbon black of conductive type (such as Ketjenblack EC from Ketjen Carbon NV, Holland).

0.8 parts by weight stearic acid (lubricant).

0.8 parts by weight alkylated diphenylamine (antioxidant, such as Nonox OD).

2.3 parts by weight polymerized trimethyl dihydroquinoline (anti-oxidant, such as Flectol).

In the extrusion of the polymer composition described later on, 2.5 parts by weight di-t-butyl peroxide is added to the polymer composition when it is positioned in the extrusion machine. The crosslinking is performed at 220° C. for a few minutes.

The application of the strippable outer semiconductive layer can be performed in the manner shown in FIG. 1. The conductor 10 is rolled off a drum 11 by means of the roll-off device 12 in the form of two endless conveyor belts and is then applied in conventional manner, for example by extrusion of a copolymer of ethylene and ethyl acrylate containing carbon black, first with an approximately 0.5 mm thick inner semiconductive layer 13 (FIG. 2) in a device (not shown) and similarly, in conventional manner by extrusion, thereafter with an insulation 16 (FIG. 2) of crosslinkable polyethylene in another device (not shown). The conductor provided with the insulation then passes through the cross head 17 of an extrusion machine 18 to be surrounded with an approximately 0.5–1 mm thick strippable, outer semiconductive layer 19 according to the present invention. The polymer composition, which forms the semiconductive layer and may have any of the compositions exemplified in Examples 1–6, is charged in the filling funnel 20 of the extrusion machine. An organic peroxide, for example of the kind stated in Examples 1–6, is charged separately through a particular tube 21 so that the polymer composition and the peroxide are efficiently mixed in the extrusion machine. The temperature in the extrusion machine is suitably maintained at about 110° C. The insulation 16 and the semiconductive layer 19 are crosslinked by heating the conductor with insulation and semiconductive layer in water steam with a temperature of 220° C. in tube 22. The time during which the conductor passes the tube 22 is approximately 5–10 minutes. From the steam tube the conductor with its insulation and semiconductive layer passes through a turning wheel 23 to a cooling tube 24 where it is pressure-cooled with water at room temperature. It then passes, by turns, a water-seal 25 and a roll-off device 26 in the form of two endless transport belts before being coiled up onto the drum 27. The roll-off devices 12 and 26 cooperate to keep the conductor stretched during the process. The cable part thus manufactured is then provided in conventional manner, possibly after having been joined to other cable parts, at least with a screen of metal and with a sheath of polymer material.

We claim:

1. In a method of applying a strippable semiconductive layer to a cable conductor which has an insulation therearound of thermoplastic or crosslinked polyethylene by extruding thereon a polymer material comprising a copolymer of ethylene and vinyl acetate, carbon black and an organic peroxide in an extrusion machine, the improvement wherein said organic peroxide is uniformly mixed with a mixture of said copolymer and said carbon black to form said polymer material after said mixture of said copolymer and said carbon black have been supplied to said extrusion machine, and heating said polymer material after the polymer material has been extruded into said insulated cable conductor so as to cause cross-linking.

2. The method of claim 1 wherein said copolymer and said carbon black are combined into a homogeneous mixture before being supplied to said extrusion machine.

3. The method of claim 1 wherein said mixture to which said organic peroxide is added also includes an elastomer.

4. The method of claim 3 wherein said mixture includes up to 40 parts by weight of elastomer per 100 parts by weight of copolymer.

5. The method of claim 1 wherein said mixture to which said organic peroxide is added also includes polyethylene.

6. The method of claim 5 wherein said mixture includes up to 40 parts by weight of polyethylene per 100 parts by weight of copolymer.

7. The method of claim 1 wherein said copolymer of ethylene and vinyl acetate contains 20–80 percent by weight of ethylene and 80–20 percent by weight of vinyl acetate.

8. The method of claim 1 wherein said mixture includes between 5 and 100 parts by weight of carbon black per 100 parts by weight of copolymer.

9. The method of claim 1 wherein said mixture includes up to 200 parts by weight of filler per 100 parts by weight of other ingredients.

10. The method of claim 1 wherein said organic peroxide when added to said mixture is in liquid form.

11. The method of claim 10 wherein said organic peroxide is selected from the group consisting of d-t-butyl peroxide, 2,5-dimethyl-2,5-d(t-butylperoxy)-hexane, 2,5-dimethyl-2,5-dimethyl-2,5-di(t-butylperoxy-hexyne-3 and 2,2-bis(t-butylperoxy)-butane.

* * * * *